Figure 1:
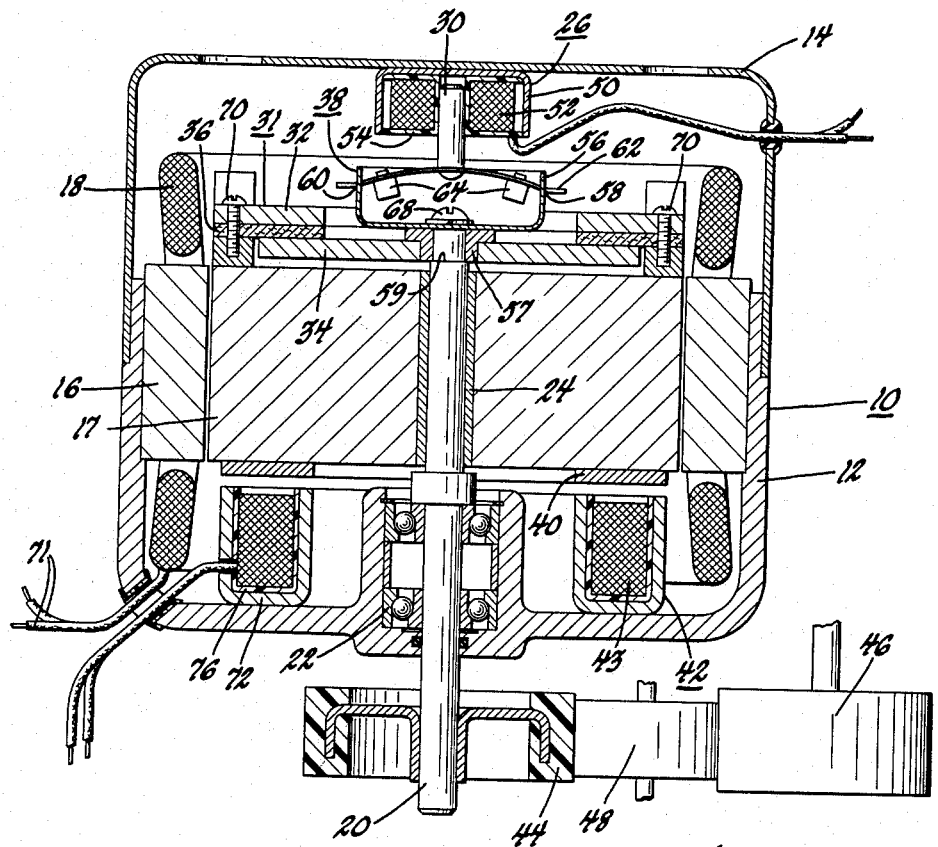

March 23, 1965

B. L. BRUCKEN 3,174,595

ELECTROMAGNETIC SPEED RESPONSIVE SLIP CLUTCH

Filed Oct. 24, 1962

INVENTOR.
Byron L. Brucken
BY Frederick M. Ritchie
HIS ATTORNEY

United States Patent Office 3,174,595
Patented Mar. 23, 1965

3,174,595
ELECTROMAGNETIC SPEED RESPONSIVE SLIP CLUTCH
Byron L. Brucken, Dayton, Ohio, assignor to General Motors Corporation, Detroit, Mich., a corporation of Delaware
Filed Oct. 24, 1962, Ser. No. 232,814
3 Claims. (Cl. 192—.033)

This invention relates to a domestic appliance and more particularly to a device for controlling the output speed of a motor under load.

In domestic appliances, such as clothes washers and waste disposers, for instance, it is frequently desirable to preselect an appliance speed and then to control the selected speed of the appliance at a constant value regardless of the load.

Accordingly, it is an object of this invention to provide a control for maintaining the output speed of a motor at a constant value.

Another object of this invention is the provision of a variably effective slip clutch for use with a motor.

Another object of this invention is the provision of a semi-conductor frictional slip clutch for use between driving and driven members wherein the effectiveness of the connection between the said members of the clutch is varied in response to the output speed of the driven member.

Further objects and advantages of the present invention will be apparent from the following description, reference being had to the accompanying drawings wherein a preferred embodiment of the present invention is clearly shown.

Figure 2:
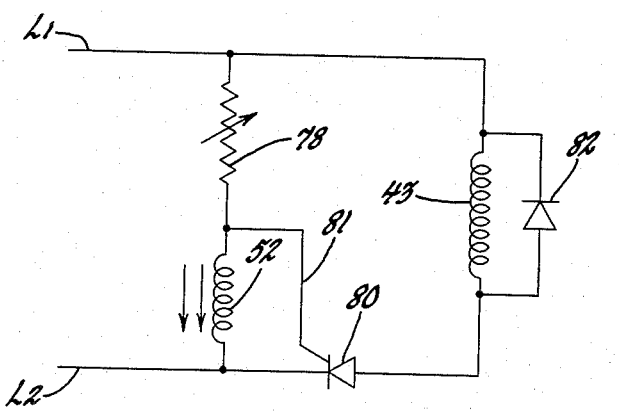

In the drawings:

FIGURE 1 is a cross sectional view of an alternating current motor provided with this invention; and FIGURE 2 is a schematic control circuit for converting motor output speed into intelligence for operating a slip clutch in the motor.

In accordance with this invention and with reference to FIGURE 1, an alternating current motor 10 is shown comprised of a motor housing 12, an end bell 14, stator 16 and field winding 18, rotor 17, motor output shaft 20, thrust bearing 22 and a rotor sleeve bearing 24. The bearing 24 provides for relative rotatable motion between the rotor or driving member 17 and the motor shaft or driven member 20. To motor 10, this invention proposes to add the following components: a pickup coil 26, a pickup shaft or armature 30, a slip clutch 31 including clutch face plates or discs 32 and 34 and frictional clutch facing material 36 between the clutch plates, a centrifugal force responsive actuator 38 connected to the pickup armature 30, and an electromagnet 42 for controlling the slip clutch and including an annular armature ring 40, and a magnet coil 43. On the output side of the motor 10, a suitable drive pinion, such as a roller 44, drives a driven roller 46 through an idler roller 48 for transferring the prime moving force of the motor 10 to a load. An example of such a load is taught in my copending application Serial No. 5,174, filed January 28, 1960, now Patent 3,087,321, issued April 30, 1963, for a roller drive agitating and spinning mechanism.

The pickup coil 26 is comprised of a housing 50 attached to the end bell 14 of the motor, said housing enclosing an electrically conductive coil 52 insulated from the pickup armature shaft or air gap forming means 30 by a sleeve 54 of nonconducting material. The shaft 30 moves up and down in the coil 52 in response to the speed of the motor shaft 20 as sensed by the centrifugal device 38.

The centrifugal device 38 is comprised of a cup-shaped housing 56 having diametrically opposite ports 58, 60 therein through which the terminal portions of a spring strip member 62 can loosely extend. The housing 56 is fastened to the upper end of the motor shaft and sandwiches the hub 57 of the lower clutch plate 34 between the housing and a shoulder 59 on the motor shaft. The spring member carries weights 64 which act to straighten the spring member 62 as the speed of the motor increases, thereby pulling the armature shaft or pin 30 downwardly out of the center of the pickup coil 52. Since the housing 56 is fastened as by a screw 68 to the upper end of the motor shaft 20, this housing will rotate at the same speed as the motor shaft and at the same speed as the lower clutch plate 34 which is also keyed or otherwise affixed solidly in any suitable manner to the motor shaft 20.

The slip clutch 31 is comprised of an annular upper plate 32 in juxtaposition to a coextensive piece of frictional materials 36— the subassembly being fastened to the rotor 17 as by bolts 70. Thus, when the motor 10 is engerized from a domestic power supply through suitable conductors 71, the rotor 17 will rotate relatively to the motor shaft 20 because of the sleeve bearing 24 and the slip clutch 31. Depending on the frictional engagement between the clutch plates 32 and 34, the motor shaft 20 will start to rotate slippingly in relationship to the clutch plate 32—the slip becoming less and less as the motor shaft speed and rotor speed equalize.

The electromagnet 42 is for the purpose of increasing the frictional engagement between the clutch plates 32 and 34 by pulling the rotor 17 downwardly. The electromagnet 42 is comprised of an annular trough-shaped housing 72 attached to the motor casing 12 and enclosing the electrically conductive coil 43. The coil 43 is insulated from the housing 72 by a coextensive non-conducting sleeve 76. When the coil 43 is energized, the electromagnet 42 is effective to attract the armature piece 40 on the rotor and thereby pull the rotor downwardly. Since the upper clutch plate 32 is attached to the rotor and the lower clutch plate 34 is axially fixed, the friction material 36 in the clutch plate sandwich will be squeezed whenever the electromagnet 42 is energized. As the frictional engagement between the clutch plates 32 and 34 increases, the slip therebetween is minimized.

With reference now to FIGURE 2, a clutch control circuit for operating the foregoing components in accordance with the teachings of this invention will now be described. The circuit includes a variable resistor or potentiometer 78, a silicon-controlled rectifier or semiconductor switch means 80 and a diode 82. These components operate on a source of domestic power $L_1$, $L_2$.

In operation, the semi-conductor controlled, slip clutch operates as follows. At a predetermined speed of the rotor 17, the pickup shaft 30 will pull partially out of the pickup coil 52 and position itself relative to the coil 52 in a manner determined by the centrifugal force exerted by the weights 64 on the centrifugal actuator 38 tending to straighten the spring strip 62. This will change the signal output of the pickup coil 52 in such a manner as to balance the voltage set on the potentiometer or variable resistor 78. Torque is applied to the motor shaft 20 through the effective connection between clutch plates 32 and 34 and is varied by the pull of the electromagnet 42 on the magnet armature 40—the rotor moving axially downwardly relative to the motor shaft on the sleeve bearing 24. The silicon controlled rectifier 80 or other suitable static switching device varies the current supplied to the magnet coil 43, thereby determining the amount of slip between the clutch plates 32 and 34.

The ultimate speed of the load shaft 46 or motor shaft 20 is determined by the amount of rotor slip in the motor.

The amount of slip is varied by the silicon-controlled rectifier 80 in such a manner as to maintain a constant load shaft speed regardless of load. The load shaft speed is initially set by the potentiometer 78 and is maintained constant by the silicon-controlled rectifier 80 through the pickup coil 52 which controls the bias on the silicon-controlled rectifier through a base leg 81 thereof. The diode 82 is used as a clamp diode to maintain current in the coil 43 during zero voltage portions of the rectified wave applied to the magnet coil 43.

It should now be seen that an improved slip clutch has been provided for a motor which will closely control output speeds of the motor.

While the embodiment of the present invention, as herein disclosed, constitutes a preferred form, it is to be understood that other forms might be adopted.

What is claimed is as follows:

1. In combination, a motor having a motor shaft member rotatable about an axis and a rotor member relatively axially and rotatably movably associated with said motor shaft member and operable for driving said motor shaft member, slip clutch means interposed between said members for selectively effecting a driving connection between said members, said slip clutch means including a first clutch disc keyed to said motor shaft member, a second clutch disc keyed to said rotor member for axial and rotatable movement therewith and spaced axially from first clutch disc, and a third clutch disc of frictional material rotatable with one of said first and second clutch discs and squeezable therebetween in sandwiched relationship for frictionally interconnecting said first and second clutch discs, and electrical control means for controlling said motor and including slip clutch regulating means for regulating the axial movement of said first clutch disc relative to said second clutch disc thereby to vary the frictional interconnection between said first and second clutch discs by varying the squeezing of said third clutch disc therebetween, said slip clutch regulating means including a power supply, speed pickup means connected to said power supply and including a coil fixed relative to said motor shaft member and means forming with said coil a magnetic air gap, said air gap forming means being movable relative to said coil in response to the actual speed of said motor shaft member thereby to produce a first signal in proportion to said actual speed, speed selector means connected to said power supply in series with the coil of said speed pickup means for producing a second signal in proportion to the preselection of a desired speed for said motor shaft member, electromganetic means connected to said power supply and in axially actuating relationship to said rotor member for varying the frictional interconnection between said first and second clutch discs by varying the squeezing of said third clutch disc, and a static switch means in power supply relationship to said electromagnetic means, said switch means including base means responsive to said first and second signals for regulating power supply to said electromagnetic means thereby to control the output speed of said motor shaft member.

2. The combination of claim 1 including a centrifugal device for moving said air gap forming means, said centrifugal device including a cup-shaped housing affixed to the end of said motor shaft member and having diametrically opposite ports, a normally bowed spring strip member attached at the center thereof to said air gap forming means and loosely extending through said ports at the extremities thereof, and a weight on said spring strip member between the center and an extremity thereof whereby rotation of said motor shaft member causes said weights to straighten said spring strip member and thereby move said air gap forming means relative to said coil.

3. The combination of claim 2 wherein said static switch means is a silicon controlled rectifier.

References Cited by the Examiner

UNITED STATES PATENTS

| 2,286,777 | 6/42 | Winther et al. | 310—95 |
| 2,577,173 | 12/51 | Worst | 192—.02 |
| 2,682,618 | 6/54 | Jaeschke | 310—95 |
| 2,788,104 | 4/57 | Mason | 192—84 |

DAVID J. WILLIAMOWSKY, *Primary Examiner.*